W. B. CLARK.
Velocipede.
No. 94,565. Patented Sept. 7, 1869.
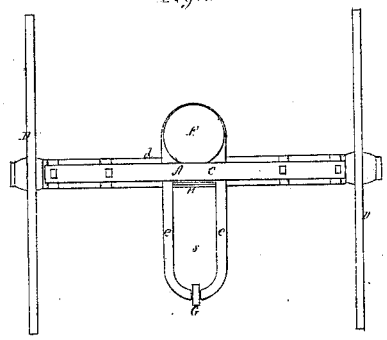
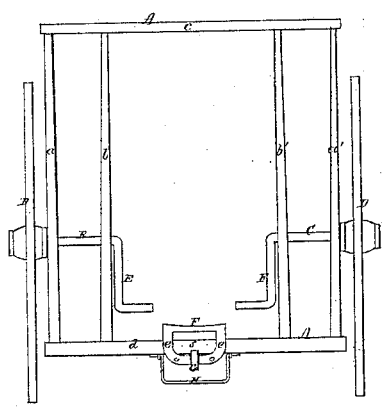

United States Patent Office.

WILLIAM B. CLARK, OF WHITEFIELD, MAINE.

Letters Patent No. 94,565, dated September 7, 1869.

IMPROVEMENT IN VELOCIPEDE.

The Schedule referred to in these Letters Patent and making part of the same.

*To all persons to whom these presents may come:*

Be it known that I, WILLIAM B. CLARK, of Whitefield, of the county of Lincoln, and State of Maine, have made a new and useful Invention, having reference to Manumotives; and I do hereby declare the same to be fully described in the following specification, and represented in the accompanying drawings, of which—

Figure 1 is a top view, and

Figure 2, a front elevation of a bicycle manumotive, constructed in accordance with my invention.

This bicycle vehicle differs from an ordinary bicycle velocipede, for it is propelled by the power of the hands, rather than by that of the feet of the rider.

In the drawings—

A is an open rectangular or square frame, composed of four upright bars $a\,b$, $a'\,b'$, and two cross or tie-bars $c\,d$, arranged in manner as represented.

This frame is provided with two separate axles, B C, which are arranged in it in manner as shown.

Each of these axles has one of a pair of wheels, D D, fixed on its outer end, and the said axle also has one of two cranks, E E, projected from its inner end, the same being as seen in the drawings.

A seat, F, arranged on the lower cross-bar $d$, in manner as represented, has two arms $e\,e$ extended from it, with a space, $s$, between them for the legs of the rider to pass down through and move in, while he may be sitting upon the seat. These arms support at their front ends the pivot or shaft of a small wheel, G, arranged as represented.

A brace or stirrup, H, suspended from or hinged to the lower bar $d$, serves as a support for the feet of the rider. By removing the seat from the frame A, in case of the seat being so applied to the frame as to admit of such, the rider may stand on the said brace.

The purpose of the third wheel G, and its supporters or supporting-arms, is to prevent the carriage-frame from being revolved on the axles so as to pitch the rider forward out of his seat, or too far forward, especially at the time of first starting the vehicle ahead.

By turning the frame A down into or nearly into a horizontal position, and laying hold of the upper bar $c$, a person will readily be able to draw or push the vehicle along with ease. So, by having the cranks applied to the axles, in such manner as to enable such cranks to be separated from them, the vehicle may be used as a hand-cart, for the transportation of merchandise or other articles.

In using this manumotive, a person is to set upon the seat with his feet resting on the suspended brace. With his hands he lays hold of the two cranks, and, by revolving them simultaneously, he will cause the wheels to turn and the machine to be propelled along. He can accomplish the latter with great activity, and can easily keep himself properly balanced in the meantime. The seat, being below the common axis of the wheels, will be suspended by the frame. By causing one wheel to revolve faster than the other, the machine may be readily steered or turned about from time to time, as occasion may require.

I therefore claim, as my invention, in the manumotive as specified—

The combination of the seat and the foot-brace with the hand-cart, as described, that is, as composed of the frame A, and the two separate axles and their wheels, arranged together and having cranks to the axles, as set forth.

Also, the combination and arrangement of the third wheel and its supporters with the seat, the foot-brace, the hand-frame A, and its cranked axles and their wheels, arranged together substantially in manner and so as to operate as set forth.

WM. B. CLARK.

Witnesses:
R. H. EDDY,
J. R. SNOW.